Feb. 3, 1970　　　　　　C. L. WILSON　　　　　　3,493,856
VELOCITY MEASURING DEVICE FOR PROJECTILES
Filed Oct. 13, 1967
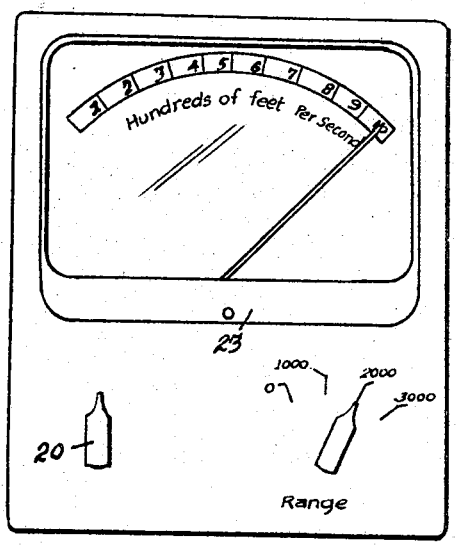
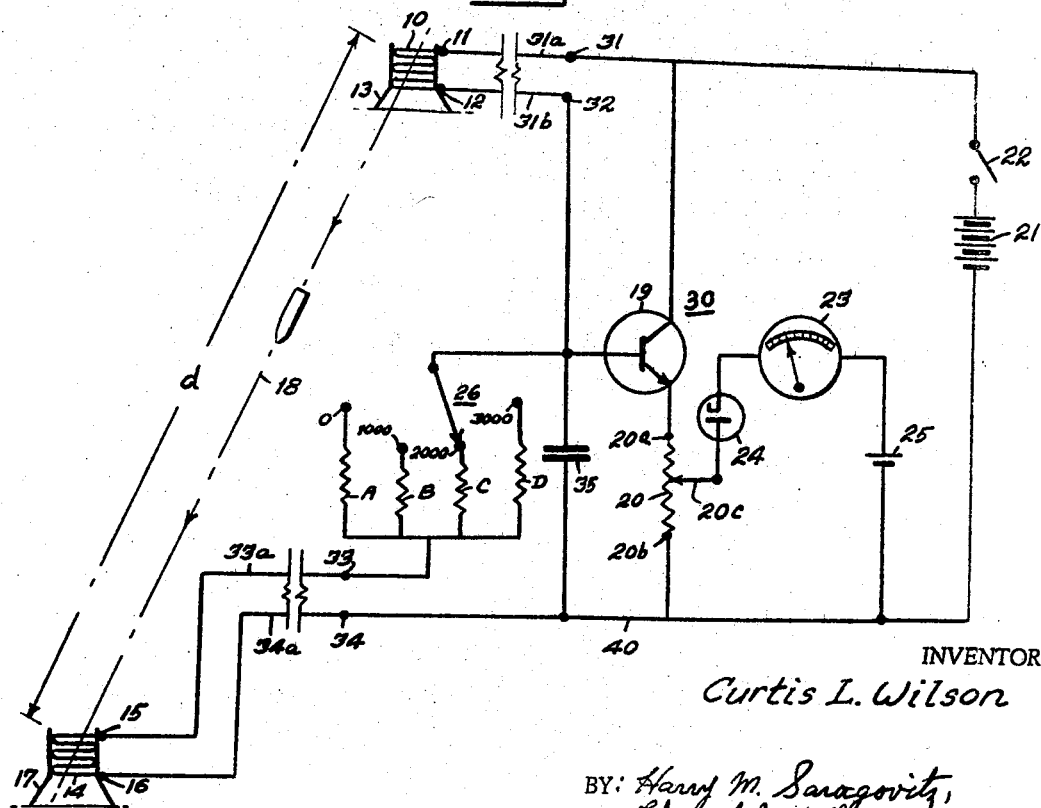
INVENTOR
Curtis L. Wilson
BY: Harry M. Saragovitz,
Edward J. Kelly,
Herbert Berl & R. P. Gibson　ATTORNEYS.

United States Patent Office 3,493,856
Patented Feb. 3, 1970

3,493,856
VELOCITY MEASURING DEVICE FOR PROJECTILES
Curtis L. Wilson, Rte. 2, Box 315B,
La Junta, Colo. 81050
Filed Oct. 13, 1967, Ser. No. 675,256
Int. Cl. G01p 3/66
U.S. Cl. 324—70        1 Claim

ABSTRACT OF THE DISCLOSURE

A velocity measuring device for measuring velocities of ordnance projectiles employing an emitter-follower having a first frangible grid in series with an RC timing network connected across the base and emitter and a second screen spaced from and in alignment with the first screen connected across the base and collector. A biased voltmeter in series with a diode connected across the emitter circuit has its dial calibrated in increments of a fraction of the total velocity thus providing a direct and high accuracy readability. The RC timing network is operated only in the extreme end of the discharge curve of the total voltage charge whereby linearity and accuracy of the meter reading are obtained.

---

The invention described herein may be manufactured and used by or for the Government of the United States of America for governmental purposes without the payment to me of any royalty thereon.

The invention relates to velocity measurement means and more particularly to means for measuring the velocity of ordnance projectiles.

Current devices for measuring the velocity of ordnance projectiles include the use of expensive and complicated electrical and electronic apparatus such as counters and digital indicating devices, whereas, the velocity measuring means of the instant invention utilizes but a relatively simple means including an emitter-follower amplifier provided with a timing circuit across its input and visual readout means across its output.

An object of the invention is a simple projectile velocity measuring device wherein is provided a direct readout means.

Another object of the invention is a velocity measuring device for measuring the velocities of ordnance projectiles having extremely high accuracy and resetability as well as being portable and compact.

Another object of the invention is a velocity measuring means for measuring velocities of ordnance projectiles and wherein interpretation or interpolation of the readout means thereof is unnecessary.

A still further object of the invention is a portable and compact velocity measuring means for measuring ordnance projectile velocities provided with selectable ranges of velocity response.

The invention will be fully apprehended from the following detailed description of a preferred embodiment taken in conjunction with the appended drawing, in which:

FIGURE 1 is a diagrammatic representation of the invention; and

FIGURE 2 is an elevational view of a housing containing the controls, readout means, amplifier and associated circuitry of the instant invention.

Referring now to FIGURE 1 of the drawing wherein a schematic diagram illustrates a preferred embodiment of the invention, reference numeral 10 indicates a grid consisting of an assemblage of closely spaced parallel wires provided with terminals 11 and 12 and mounted on a frame of insulating material 13 which is adapted to support the grid in a vertical plane on a firing range. Reference numeral 14 indicates a second grid identical to grid 10 and provided with terminals 15 and 16. Grid 14 is also supported in a vertical plane on the firing range in the same manner as grid 10 by means of insulating frame 17. Each of said grids comprises a plurality of spaced parallel wire forming a continuous electrical conductor as shown in the drawing so that severage of any portion thereof will cause a break in the electrical circuit connected to said terminals. Grids 10 and 14 are placed in alignment with each other on the firing range with their broad sides facing each other and spaced a predetermined distance $d$. A projectile when fired will travel along a flat trajectory as indicated by line 18 to first pierce grid 10 whereby a circuit is opened and then grid 14 whereby another circuit is opened.

An emitter-follower amplifier 30 consisting of transistor 19 has the emitter connected to a first terminal 20a of potentiometer 20 which comprises the emitter resistor. A D.C. power supply means 21 has one terminal connected to the collector of transistor 19 through switch 22 and to a terminal 31 which is connected to terminal 11 of grid 10 by means of conductor 31a. The other terminal 12 of grid 10 is coupled to the base of transistor 19 by means of conductor 31b and terminal 32. Another terminal of D.C. power supply 21 is connected to a second terminal 20b of potentiometer 20. A voltmeter 23 whose scale is calibrated in units of velocity which in the instant embodiment is 0–1000 feet per second is connected across the output of the emitter-follower amplifier 30. One terminal of voltmeter 23 is connected to rotating arm 20c of potentiometer 20 through diode 24 for the purpose of preventing the voltmeter from reading off scale in the downward direction when the emitter resistance voltage is lower than the voltage of biasing means 25 which is connected between another terminal of voltmeter 23 and terminal 20b of emitter resister 20. Biasing means 25 approximating the D.C. supply potential provides bias to ensure that voltmeter 23 will read only the linear portion of the voltage discharge of capacitor 25. The R.C. time constant circuit connected across the input of emitter-follower amplifier 30 consists of capacitor 35 having one terminal connected to the base of transistor 19 and another terminal to terminal 20b of emitter resistor 20 and resistors A, B, C and D which through said second grid 14 are individually switched in parallel with capacitor 35 by means of range switch 26. The ohmic values of resistors A, B, C and D being selected in consideration of the spacing between grids 10 and 14 and the various projectile velocity ranges. For example, the value of resistor A is selected in consideration of projectile velocities; the value of resistor B selected in consideration of projectile velocities between 2000 and 3000 ft./sec.; the value of resistor C selected in consideration of projectile velocities between 3000 and 4000 ft./sec.; and the value of resistor D selected in consideration of projectile velocities between 4000 and 5000 ft./sec. The taps of range switch 26 are indicated by references 0, 1000, 2000 and 3000 to indicate the velocity range in feet per second for each position of range switch 26 as illustrated in FIGURES 1 and 2. As can be seen from the schematic, one terminal of each resistor is connected to a respective contact on range switch 26. The other terminals of said resistors being connected to a terminal 33 which is connected to terminal 15 of grid 14 by means of conductor 33a. Terminal 16 of grid 14 is connected by means of conductor 34a to terminal 34 of the common circuit 40 of emitter-follower amplifier 30.

In operation, grids 10 and 14 are aligned on the firing range a predetermined distance apart as hereinafter described and switch 22 closed whereby the D.C. power supply 21 energizes the complete circuit. Capacitor 35 then charges, through grid 10, to the voltage of D.C.

power supply 21. The velocity range is then selected by means of range switch 26 and potentiometer 20 adjusted until the calibrated voltmeter 22 reads full scale which in the instant embodiment would be a reading of 1000 feet per second. Assuming the velocity of the projectile that is fired so as to travel along trajectory 18 to be within the 2000–3000 ft./sec. range, range switch 26 would be set to the 2000 ft./sec. range as shown in FIGURE 2. The projectile first passes through grid 10 whereupon capacitor 35 which is charged to the potential of D.C. power supply 21 is disconnected from said power supply and starts to discharge through resistor C. This discharge within the limits of the capacitor linear discharge continues only as long as it takes the projectile to travel from grid 10 to grid 14. When the projectile passes through grid 14 resistor C is disconnected from capacitor 35 and the discharge path broken whereupon capacitor 35 maintains a lower but steady potential across the input to emitter-follower amplifier 30. When grid 10 is broken by the projectile the voltage of capacitor starts to decrease which results in the lowering of the voltage drop across potentiometer 20 which is measured by the calibrated voltmeter 23. When grid 14 is broken by the projectile the aforementioned lower but constant potential is applied to to the input of emitter-follower amplifier 30 and is reflected in the output thereof and indicated on the calibrated voltmeter 23 which then maintains a lower but steady reading. For example, if under the above recited conditions the calibrated voltmeter declines from a reading of 1000 to 450 feet per second during the time required for the projectile to pass through grid 10 and then grid 14, the projectile's velocity is easily determined by adding the calibrated voltmeter 23 reading of 450 ft./sec. to the range switch 26 setting of 2000 ft./sec. It is to be noted that only a small segment of the velocity range is read on the calibrated voltmeter 23 thereby enhancing the accuracy of the results.

Regarding the calibration and operation of the instrument, the 1000 feet per second range is selected for the initial adjustment of the instrument, that is, the spacing of grids 10 and 14 is adjusted so that the R.C. timing circuit is operable only on the linear discharge portion of the capacitor 35 discharge curve. This condition prevails when the grids are so spaced that when a projectile of known velocity of 1000 feet per second severs grid 10 capacitor 35 starts discharging, assuming the instrument has been energized, and potentiometer adjusted for full scale deflection of meter 23 and then severs grid 14 at the time of expiration of said linear discharge portion. During this excursion of the capacitor discharge, the indicator of the biased meter 23 moves from maximum position to zero in cooperation with the biasing circuitry in response to the output of the emitter-follower 30. In detail, when switch 22 is closed the circuit is energized and capacitor 35 charges up to the potential of D.C. power supply 21, but when grid 10 is severed the capacitor starts to discharge through the range resistor and continues to discharge through the range resistor and continues to discharge until grid 14 is severed during which discharge the potential at the top of capacitor 35 diminishes and is reflected in the emitter output of emitter-follower 30, potentiometer 20. Potentiometer 20 is initially adjusted so that the positive potential at the plate of diode 24 is greater than the positive potential of meter 23 biasing means 25, which approximates the potential of D.C. source 21, whereby full scale deflective of meter 23 is obtained. As the positive potential applied to the plate of diode 24 diminishes in accordance with the discharge of capacitor 35, it results in insufficient positive potential being applied to the plate of diode 24 to overcome the potential of biasing means 25 whereupon the indicator of meter 23 will start to move down scale and will reach zero, due to no current flow with meter circuit, when the capacitor 35 has sufficiently discharged, at the end of the linear discharge, to cause the potential on the plate of diode 24 to be equal to and having the same polarity as the potential of biasing means 25 as is this case in the use of the projectile of known velocity whereby the meter 23 is calibrated. Thus it can be seen that when a projectile of higher velocity than the velocity of the projectile used for calibration purpose is fired through the screens, the timing capacitor discharge will stop before the expiration of the time of linear discharge thereof where upon the meter so calibrated indicates the projectile velocity in excess of the known projectile velocity.

I claim:

1. Apparatus for measuring the velocity of ordnance projectiles comprising in combination, a first electrical grid provided with a pair of terminals, a second electrical grid provided with a pair of terminals, each said grid adapted to be broken by passage of a projectile therethrough whereby an open circuit is established between said pair of terminals, said grids spaced a predetermined distance apart along a firing range determined by the lapsed time of the linear discharge portion of the timing capacitor of an R.C. circuit in relation to a known projectile velocity and oriented to be pierced by a projectile, an emitter-follower amplifier comprising a transistor having a base, collector and emitter including an emitter resistor consisting of a potentiometer, said potentiometer connected between the emitter and common circuit of said amplifier, said R.C. circuit comprising velocity range means connected between said base and said common circuit, one terminal of said first grid connected to said D.C. power supply means, another terminal of said first grid connected to said R.C. circuit whereby the timing capacitor thereof charges to the potential of said D.C. power supply means, the resistor element of said R.C. circuit consisting of a multiplicity of resistors adapted to be individually switched across said timing capacitor by means of a rotary switch, each combination of said resistors and timing capacitor constituting a velocity range, the rotor of said switch connected to a common junction formed by said base and one terminal of said capacitor, one terminal of each said resistors connected to a separate contact of said switch, the other terminals of each said resistor forming a common junction connected to a terminal of said second grid, another terminal of said second grid being connected to said common circuit, said projectile first breaking said first grid whereby said D.C. power supply means is disconnected from said timing capacitor and said timing capacitor discharges through a selected resistor until said projectile breaks said second grid whereupon said selected resistor is disconnected from said common circuit and said timing capacitor applies a steady but lower potential to said base, which is reflected across said potentiometer, and means connected across the output of the emitter-follower amplifier for indicating that portion of said projectile velocity in excess of said known projectile velocity comprising a voltmeter calibrated in units of velocity having one terminal coupled to the positive pole of a biasing potential approximating the potential of said D.C. power supply, the negative pole of said biasing potential connected to said common circuit, another terminal of said voltmeter being connected to the positive pole output of said potentiometer the potential output of which is adjusted during the quiescent state to cause full deflection of said voltmeter, said potentiometer potential diminishing in response to the diminishing potential on said timing capacitor during the time lapse over the linear discharge thereof between severance of said grids whereby said potentiometer potential approaches the potential of said biasing potential with the resultant lower reading on said meter indicating the velocity of said projectile in excess of said known projectile velocity and means to prevent said meter from reading off scale in a downward direction comprising a diode having the cathode element connected to said another terminal and an anode element connected to the output of said potentiometer.

References Cited

UNITED STATES PATENTS

| | | | |
|---|---|---|---|
| 1,925,483 | 9/1933 | Dubois | 324—70 |
| 2,177,569 | 10/1939 | Jorgensen | 324—68 |
| 2,587,775 | 3/1952 | Sheldon | 324—70 |
| 2,743,417 | 4/1956 | Hollmann | 324—68 |
| 3,230,450 | 1/1966 | Clark | 324—70 |
| 3,378,766 | 4/1968 | Tobey | 324—70 |

RUDOLPH V. ROLINEC, Primary Examiner

MICHAEL J. LYNCH, Assistant Examiner